United States Patent [19]

Flagan et al.

[11] Patent Number: 4,994,107

[45] Date of Patent: Feb. 19, 1991

[54] AEROSOL REACTOR PRODUCTION OF UNIFORM SUBMICRON POWDERS

[75] Inventors: Richard C. Flagan; Jin J. Wu, both of Pasadena, Calif.

[73] Assignee: California Institute of Technology, Los Angeles, Calif.

[21] Appl. No.: 248,486

[22] Filed: Sep. 8, 1988

Related U.S. Application Data

[63] Continuation of Ser. No. 883,573, Jul. 9, 1986, abandoned.

[51] Int. Cl.⁵ .................. C01B 33/02; C22C 1/04; B05D 7/00
[52] U.S. Cl. ..................................... 75/367; 423/341; 423/350; 423/409; 423/439; 427/213; 427/214; 427/215
[58] Field of Search ......... 423/348, 349, 350, DIG. 6; 427/213, 214, 215; 118/716; 75/0.5 B, 0.5 BA, 0.5 BB, 0.5 BC

[56] References Cited

U.S. PATENT DOCUMENTS

| | | | |
|---|---|---|---|
| 3,800,740 | 4/1974 | Robinson | 118/716 |
| 4,084,024 | 4/1978 | Schumacher | 423/350 |
| 4,207,360 | 6/1980 | Padovani | 427/213 |
| 4,642,227 | 2/1987 | Flagan et al. | 423/349 |

FOREIGN PATENT DOCUMENTS

| | | | |
|---|---|---|---|
| 39-9068 | 5/1964 | Japan | 423/350 |
| 0023025 | 2/1980 | Japan | 423/349 |
| 0057909 | 4/1984 | Japan | 423/350 |

*Primary Examiner*—John Doll
*Assistant Examiner*—Lori F. Cuomo
*Attorney, Agent, or Firm*—Antonio M. Fernandez

[57] ABSTRACT

A method of producing submicron nonagglomerated particles in a single stage reactor includes introducing a reactant or mixture of reactants at one end while varying the temperature along the reactor to initiate reactions at a low rate. As homogeneously small numbers of seed particles generated in the initial section of the reactor progress through the reactor, the reaction is gradually accelerated through programmed increases in temperature along the length of the reactor to promote particle growth by chemical vapor deposition while minimizing agglomerate formation by maintaining a sufficiently low number concentration of particles in the reactor such that coagulation is inhibited within the residence time of particles in the reactor. The maximum temperature and minimum residence time is defined by a combination of temperature and residence time that is necessary to bring the reaction to completion. In one embodiment, electronic grade silane and high purity nitrogen are introduced into the reactor and temperatures of approximately 770° K. to 1550° K. are employed. In another embodiment silane and ammonia are employed at temperatures from 750° K. to 1800° K.

11 Claims, 3 Drawing Sheets

AEROSOL REACTOR PRODUCTION OF UNIFORM SUBMICRON POWDERS

ORIGIN OF INVENTION

The invention described herein was made in the performance of work supported in part by the Flat Plate Solar Array Project, Jet Propulsion Laboratory, California Institute of Technology, sponsored by the U.S. Department of Energy through an agreement with NASA.

This application is a continuation of application Ser. No. 06/883,573 filed July 9, 1986, now abandoned.

BACKGROUND OF THE INVENTION

This invention relates to a method of producing submicron nonagglomerated particles of material and more particularly to a method of producing particles in the range of 0.05 to 0.5 micrometers from a gas or gases.

There is a growing need in the production of ceramics with high strength at high temperatures for starting powders with carefully controlled properties. The ideal powder for such application would consist of spherical non-agglomerated submicron particles with carefully controlled compositions and size distribution. It has been suggested (1) that the particles should be uniformly sized but theoretical arguments suggest that a carefully controlled size distribution with a definite upper bound in size would result in higher green compact densities. In either case, precise control of particle size, morphology, and agglomeration is needed. These properties make it possible to produce very uniformed packing of the starting materials, a critical step in ceramics processing.

A variety of methods are presently used to generate these starting powders. Extreme uniformity of particle size is achievable by solution synthesis, such as described by E. A. Barringer and H. K. Bowen "Formation Packing and Centering of Monosphere TiO2 Powders", *Communications of the American Ceramic Society* C-199-c-201 December 1982: and J. Gobet and E. Matijevic "Preparation of Uniform Colloidal Cadmium and Lead Selenide Particles", *Journal of Colloid and Interface Science* 100, 1984. However, this technique is applicable to a limited range of compositions. Highly uniform powders of silicon, silicon carbide and silicon nitride have recently been generated by laser-induced pyrolysis of silane, such as disclosed by W. R. Cannon, S. C. Danforth, J. H. Flint, J. S. Haggerty, and R. A. Marra, "Sinterable Ceramic Powders from Laser-Driven Reactions: I. Process Description and Modeling," *Journal of American Ceramic Society* 65-7-1982 and W. R. Cannon, S. C. Danforth, J. S. Haggerty, and R. A. Marra "Sinterable Ceramic Powders from Laser-Driven Reactions: II. Powder Characteristics and Process Variables," *Journal of American Ceramics Society* 65-7-1982.

Thermally induced vapor phase reactions have also been used to produce a variety of powders. Oxide particles are produced by vapor phase oxidation of metal halides in externally heated furnaces, such as disclosed by Y. Suyama and A. Kato, "TiO2 Produced by Vapor Phase Oxygenolysis of TiCl", *Journal of American Ceramic Society* 65-7-1982. Oxide particles are also produced in flames, such as disclosed by G. D. Ulrich, "Theory of Particle Formation and Growth in Oxide Synthesis Flames", *Combustion Science Technology* 4,1971 and G. D. Ulrich, B. A. Milnes and N. S. Subranmanian, "Particle Growth in Flames: II. Experimental Results for Silica Particles," *Combustion Science Technology* 14-1976 and G. D. Ulrich and N. S. Subranmanian "Particle Growth in Flames: III. Coalescence as a Rate Controlling Process," *Combustion Science Technology* 17, 1977. Silicon nitride powders have been synthesized in a reaction of ammonia and silane in a heated tube as disclosed by S. Prochazka and C. Greskovich "Synthesis and Characterization of a Pure Silicon Nitride Powder", *Ceramic Bulletin* 57,1978.

A common feature of these processes is the rapid production of condensible products by gas phase reactions leading to the formation of large numbers of very small particles. The residence time is generally long enough for appreciable growth by coagulation and since this growth takes place at high temperature, for sintering of the agglomerates. This results in low-density flocs that can make subsequent processing of the powder difficult. The Prochazka article on page 579 points out on the top of the second column that the silicon nitride powders prepared were amorphous. At the beginning of the text in the second column it is pointed out that the furnace was heated to a selected temperature and there is no discussion of temperature control, so an isothermal reaction at a constant temperature is implied. Again, on page 580 in the second column under the heading Crystallization Behavior of Amorphous Silicon Nitride it is pointed out that all of the powders prepared were amorphous to x-rays.

Another article by S. K. Friedlander "The Behavior of Constant Rate Aerosol Reactors", *Aerosol Science and Technology* 1:3-13 (1982), at page 3 points out that the reactor is a constant rate aerosol reactor. The stage diagram on the top of page 5 of this article points out the nucleation transition coagulation and agglomeration stages. Coagulation is further discussed under the title "Coagulation and Surface Area" on page 10.

Two additional articles on laser formation, one by John H. Flint, Robert A. Marra, and John S. Haggerty, "Powder, Temperature, Size and Number Density in Laser-Driven Reactions", *Aerosol Science and Technology*, 5:249-260 (1986): and a second by J. S. Haggerty, G. Garvey, J. M. Lihrmann and J. E. Ritter, "Processing and Properties of Reaction Bonded Silicon Nitride made from Laser Synthesized Silicon Powders", presented at the MRS Conference, Dec. 2-5, 1985, again point out agglomeration in the Flint article on page 258, column 2. The Haggerty article, however, although referring to aggregates on page 3 thereof, points out that compact densities improve with the elimination of the fines and aggregates which were centrifugally separated to produce a powder with a more uniform particle size distribution though formed during the process.

Another article by H. Komiyama, T. Kanai, and H. Inoue "Preparation of Porous Amorphous and Ultrafine TiO2 Particles by Chemical Vapor Deposition", from *Chemistry Letters of the Chemical Society of Japan*, 1984, pages 1283-1286, also points out that titanium oxide particles formed were amorphous and porous. The scanning electron micrographs illustrated in FIG. 3 on page 1285 show the size and agglomerate nature. Low temperature chemical vapor deposition was used in this approach and the temperature of the reactor was maintained constant within 10° C. within a zone extending twenty centimeters downstream of the nozzle.

In a related case filed by R. Flagan and M. Alam, Serial Number 572604, filed Jan. 20, 1984 now U.S. Pat.

No. 4,642,227, issued Feb. 10, 1987, a continuation in part of application Ser. No. 409941, filed Aug. 20, 1982, entitled "Reactor for Producing Large Particles of Materials from Gases," a method was developed to meet a need for this synthesis of high purity bulk materials using aerosol processes. Previous attempts to produce bulk materials by gas phase reactions in flow reactors generated very fine particles that were not well suited for the anticipated processing methods. In this case a method was presented with which the formation of new particles could be suppressed to allow a small number of seed particles to grow to large size. The growth was predominatedly by chemical vapor deposition. The seed particles were produced by nucleation in a separate reactor stage and then diluted to limit the number concentration to allow the desired growth given the amount of reactant introduced in the gas system. These particles were of a size larger than one micron but less than one hundred microns and the process was used for example to produce extremely pure silicon such as for use in semiconductor devices.

The current invention focuses on a different need. That of supplying fine submicron particles for use in the synthesis of bulk ceramics and other powder-based materials. When a material is synthesized from a powder, voids in the green packing of powder lead to the formation of defects that reduce the strength of the final bulk structure. The size of the defects is directly related to the size of the largest particles in the starting powder. This has led ceramists to define the ideal powder as one consisting of monosized particles in the submicron size range. The particles should also be approximately equiaxed so that the orientation of packing does not promote the formation of large voids. There is reason to believe that higher green packing density would be achieved with a powder that contains two or more sizes of particles, but it is clear that the size distribution should be carefully controlled with strict limits on the maximum particle size and control of particle morphology. The particle should be approximately spherical with a minimum of agglomeration and in particular with minimal formation of sintered agglomerates.

A method developed to supply fine powders with these characteristics has similarities to the reactor for large particle production but there are also important differences. First, the target particle size of the new reactor is in the size range that the first invention sought to avoid. The seed particles used in the original reactor were in the size range of interest for the present invention but did not meet the criteria for particle morphology or for control of the particle size distribution. This resulted from the relatively large numbers of particles generated in the seed generator—number concentrations that were large enough that appreciable coagulation occurred. The agglomerates thus produced partially sintered, but did not fuse into dense spheres. Coagulation also leads to a relatively broad particle size distribution. To produce uniformly sized nonagglomerated particles requires growing relatively small numbers of very small seed particles primarily by chemical vapor deposition. While as in the original reactor, suppressing the formation of new particles in high enough numbers to compete with the growth of the seeds or to allow significant coagulation.

This was accomplished in the present invention in a single stage reactor in which small numbers of very fine seeds were produced by nucleation of gas phase reaction products. To produce small number concentrations requires that the initial rate of reaction be very slow. The seeds are then grown at a gradually accelerating rate as in the original reactor. What has been demonstrated is that by carrying out a very slow reaction initially, the number concentration of small particles produced in the initial burst of nucleation can be kept small enough to minimize coagulation of the particles during their growth. And secondly, that through careful control of the rate of reaction later in the reaction process suppression of the formation of large numbers of new stable particles (homogeneous nucleation) can be achieved even with the relatively low number concentrations of small particles used in the reactor.

OBJECT AND SUMMARY OF THE INVENTION

An object of this invention is to provide a method for producing submicron nonagglomerated particles.

Electronic grade silane is used as the reactant and high purity nitrogen is used as a diluent in an example of the invention disclosed herein. However, it will be apparent that other reactants such as halogenated metals, and ammonia or hydrocarbons and a reducing agent from Group I of the Periodic Table may be employed.

Briefly, in its broadest aspects the invention is comprised of the method of producing submicron nonagglomerated particles which includes the steps of introducing a reactant or mixture of reactants at one end of a reactor while varying the temperature along the reactor to initiate reactions at a low rate to generate homogeneously small numbers of seed particles in the initial section of the reactor. The reaction is then gradually accelerated through programmed increases in the reaction wall temperature along the length of the reactor to promote particle growth by chemical vapor deposition while minimizing agglomerate formation by maintaining a sufficiently low number concentration of particles in the reactor such that coagulation is inhibited within the residence time in the reactor. The maximum temperature and minimum residence time is defined by a combination of temperature and residence time that is necessary to bring the reaction to completion. The halogen system may involve an equilibrium rather than complete reaction.

In one embodiment electronic grade silane and high purity nitrogen are introduced into the reactor and temperatures of approximately 770° K. to 1550° K. are employed.

In another embodiment silane and ammonia are employed at temperatures from 750° K.–1800° K.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1a is a cross-section of the reactor employed in the present invention, and FIG. 1b is an enlargement of the lower portion of the reactor and the diluter at the end of the reactor enclosed by a circle B in FIG. 1a.

FIGS. 4a and 4b show two electron micrographs at different magnifications.

FIG. 5 is an electron diffraction pattern of a very small fraction of the powders indicating that a small fraction are truly amorphous.

DESCRIPTION OF THE PREFERRED EMBODIMENTS

Figures 1A, 1B:
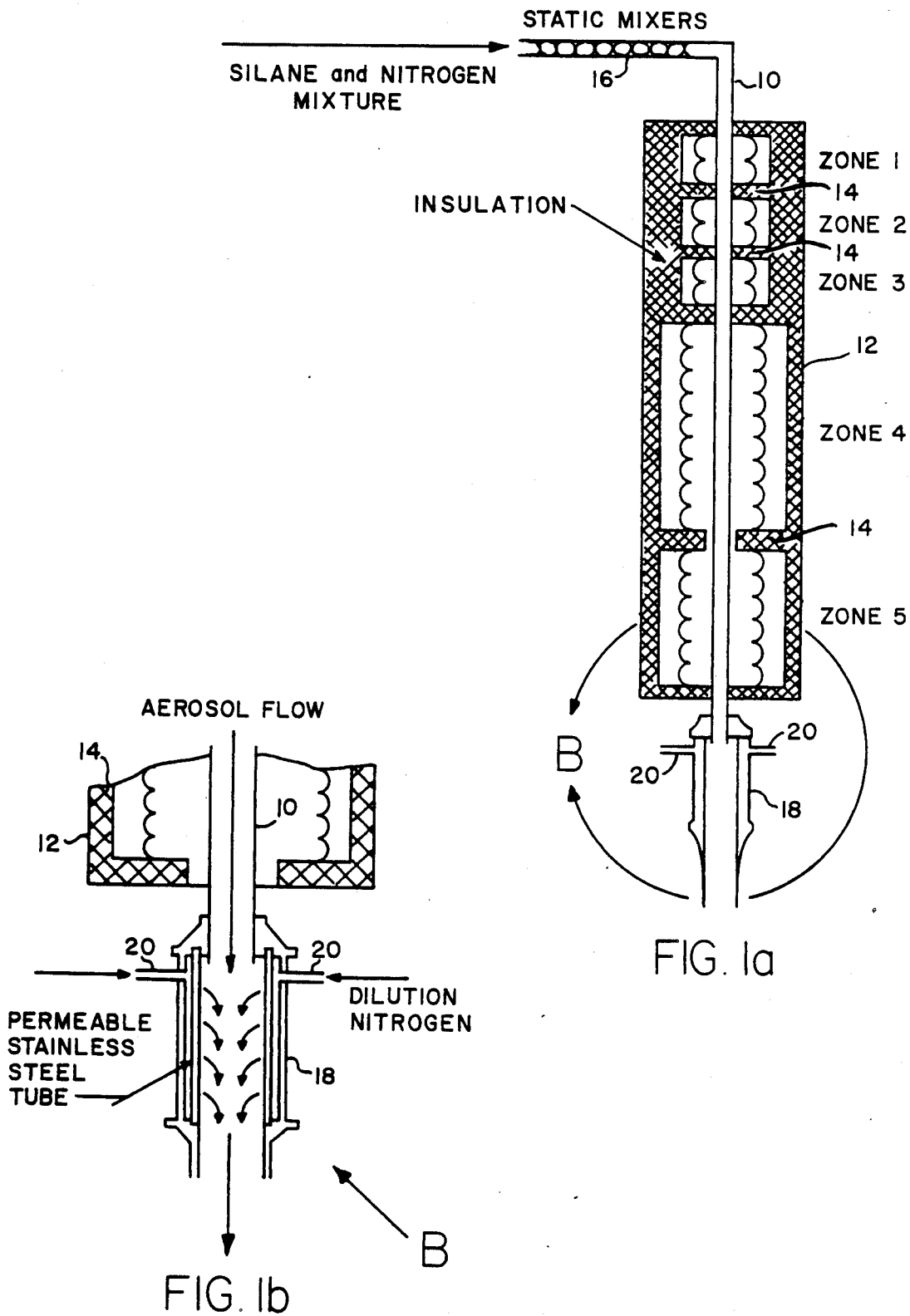

A powder synthesis by thermally induced vapor phase reactions is described. The powder generated by this technique consists of spherical nonagglomerated particles of high purity. The particles are uniform in size in the 0.1 to 0.2 micron size range. Most of the particles are crystalline spheres. A small fraction of the spheres are amorphous. Chain agglomerates account for less than one percent of the spherules. The method of the invention provides for the synthesis of particles of controlled composition and particle size by thermally induced chemical reactions. This process is applied to the synthesis of silicon powders in the 0.15 to 0.25 micron size range. The production of uniformly sized nonagglomerated solid particles of spherical shape by gas phase chemical reactions is possible only under special circumstances. The initial step in particle formation is homogeneous nucleation which generally leads to very high concentrations of very small particles. These particles can grow by Brownian coagulation or by vapor deposition, either chemical or physical. Brownian coagulation of solid particles leads to the formation of low density flocs that may be densified by sintering or vapor deposition. Coagulation leads to a relatively broad particle size distribution, a limiting case of which is the so-called self preserving particle size distribution which maintains its shape as the particles grow.

On the other hand the growth of particles by vapor deposition narrows the particle size distribution as the particles grow. Vapor deposition can dominate over coagulation only when the particle concentration is low since coagulation is a second order process. When gas phase chemical reactions generate refractory species, it is very difficult to prevent the formation of large numbers of particles by homogeneous nucleation even though there may be many particles present in the system.

To generate particles with the desired characteristics it is therefore necessary to produce particles much smaller than the desired powder size by homogeneous nucleation, with the number concentration being kept low enough to prevent appreciable coagulation, and to grow those particles by deposition of the products of gas phase chemical reactions that are carried out at such a rate that additional new particle formation from the gas is suppressed. As particles grow by vapor deposition they depress the vapor pressure of the condensible reaction products and reduce the tendency to nucleate. The influence of growing particles on the nucleation rate has been the subject of numerous investigations.

With this information and knowledge of the reaction kinetics of the system of interest, a reactor can be designed to grow particles with the desired characteristics. Multi-stage reactors have previously been developed in which silicon particles as large a ten micron mass medium diameter were grown directly from the products of the thermal pyrolysis of silane as described in the patent application cited above. In those experiments the seed particles that were grown by vapor deposition ranged in diameter from 0.1 to 1.5 microns. In the primary particle growth stage of the reactor the silane pyrolysis rate was gradually accelerated from a very low value as the particles grew and became more effective at scavenging condensible vapors. This was accomplished by ramping the temperature along the length of the flow reactor.

The synthesis of uniform particles of 0.1 micron diameter requires the use of small numbers of very much smaller particles as seeds to be grown by vapor deposition. This is accomplished in a single stage reactor, such as shown in FIG. 1a, in which the reaction rate is initially very low. At a sufficiently low reaction rate, the size and number concentration generated by nucleation is severely limited. By ramping the temperature along the length of the flow of reactor 10, using the five zone furnace 12 illustrated in FIG. 1, the rate of reaction is accelerated and the seeds are grown by vapor deposition. The reactor consists of a twelve millimeter ID quartz tube 10 that is eight hundred and fifty millimeters long. The first three heating zones are fifty millimeters long and are separated by ten millimeters of low density insulation 14. The fourth and fifth heating zones are three hundred and fifty millimeters and one hundred and fifty millimeters long respectively, and again are separated by insulation 14.

Figure 2:
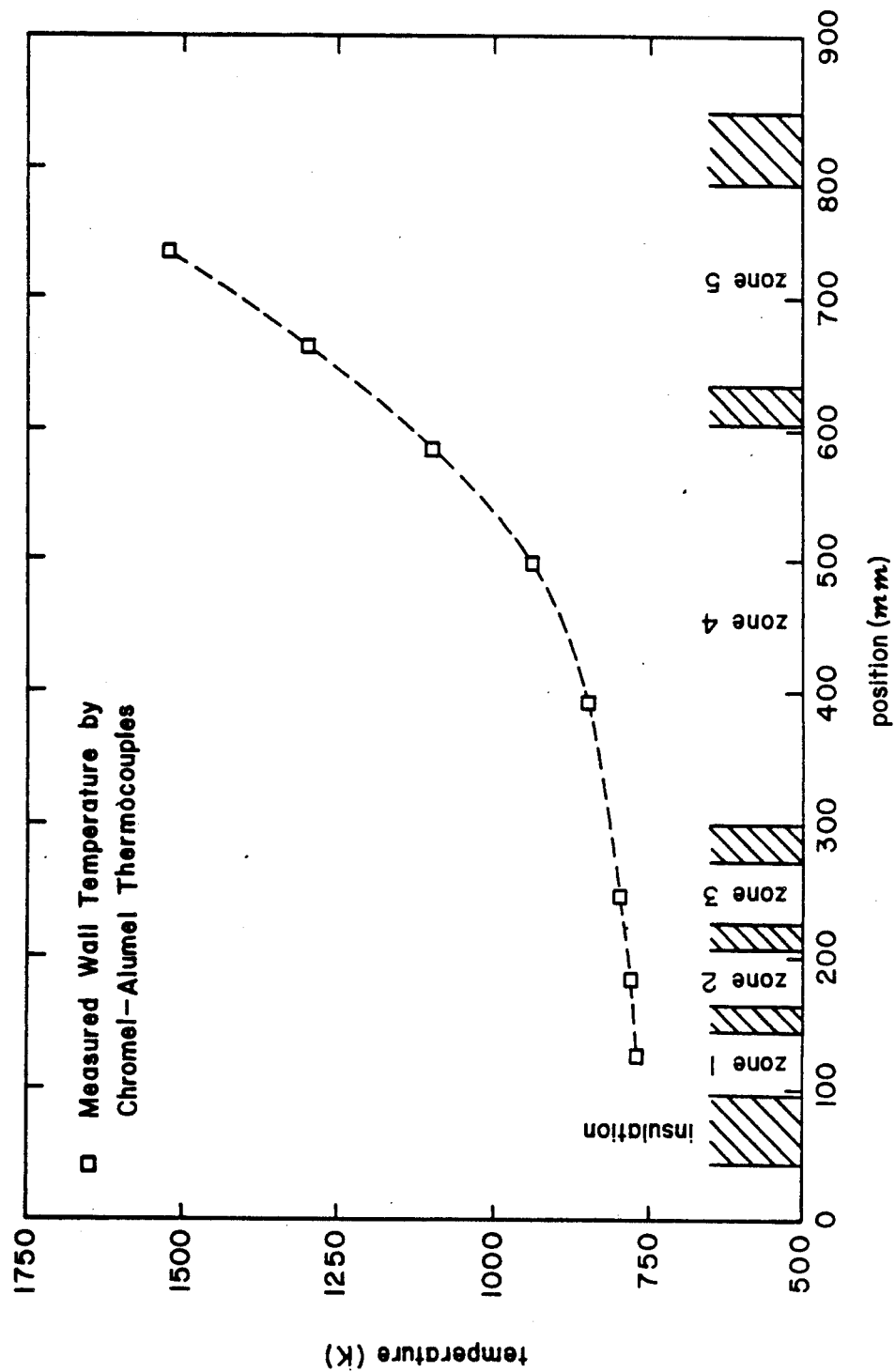
FIG. 2 is a graph of the temperature profile along the length of the reactor in mm. vs. temperature in °K.

Electronic grade silane, Union Carbide 99.99%, and high purity nitrogen, further purified and dried by passing over hot copper, were thoroughly mixed with a series of static mixers 16 (Luwa, Inc.) and introduced in the upper end of the reactor tube 10, the temperature of the first furnace zone was maintained at 770° K. to assure a low initial reaction rate. In the first four hundred millimeters of the reactor length the temperature was increased only to 800° K. plus or minus 1°. This low initial temperature and slow heating allows for a low initial reaction rate and time for the nuclei that result to begin to grow. The temperature at the end of the fourth heating zone was increased to 1100° K., a sufficiently high temperature that complete decomposition was assured. In the remaining lengths of the furnace the temperature was increased to 1523° K. to densify silicon particles. The temperature profile is illustrated in FIG. 2 in degrees Kelvin vs. position along the reactor in mm. The flow rate of the silane was 700 cc/min and the residence time in the reactor was 2.5 sec.

The product aerosol was collected on teflon membrane filters (not illustrated). To prevent thermophoretic deposition of the small particles in the hot reactant flow on the cool walls of the sampling system, the aerosol was first diluted in the porous tube arrangement 18, shown in FIG. 1b in more detail. By blowing cool, room temperature, nitrogen through the wall of the diluter 18 through tubes 20, the particles are transported away from the vicinity of the wall and high temperature gradients that would otherwise lead to substantial losses of the product particles. The filter holders were sealed following sample collection and taken to a nitrogen glove box (not illustrated) where the silicon was transferred to bottles for storage and shipping.

Figure 3:
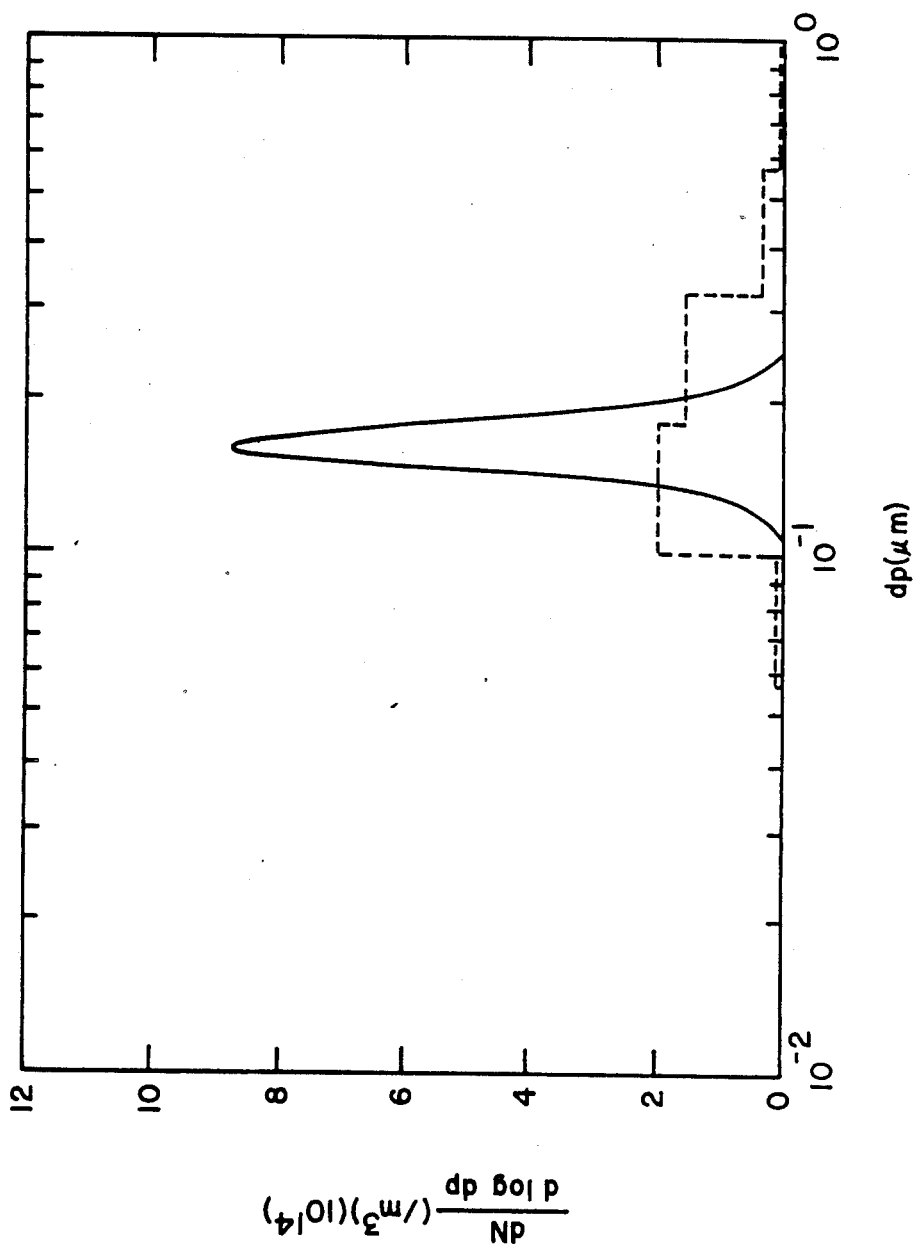
FIG. 3 is a graph of the size distribution of the particles in micrometers versus derivative of the number of particles per cubic meter of a gas with respect to the logarithm of the particle diameter.

The size distribution and number concentration of the silicon aerosol at the reactor outlet were measured using a TSI Model 3030 Electrical Aerosol Size Analyzer, a Royco Model 226 Laser Optical Particle Counter and an Environment One Condensation Nuclei Counter. The total number concentration of the product aerosol was $2 \times 10^{14}/m^3$. The size distribution is illustrated in FIG. 3. The particles were highly uniform in size at about 0.15 microns diameter.

The silicon powders were brown in color, indicative of high purity silicon powders. Electron micrographs showed that the particles were dense, spherical and uniformly sized. The vast majority of the spherules exhibited the morphologies shown in FIGS. 4a and 4b. The structure of these particles consisted of diamond cubic grains with dimensions of 0.05 to 0.1 microns, showing extensive twinning and stacking faults. The twin lamellae extend across the entire grain diameter suggesting that the transformed region sweeps across the entire particle as a planar front upon the amorphous to crystalline phase transformation.

A similar microstructure has been observed during the $ZrO_2$ tetragonal to monoclinic transformation in the system $ZrO_2$ to zicron, which is described in the article by R. McPhersen, B. V. Shafer and A. M. Wong, "Zicron - Zicronia Ceramics prepared from Plasma Dissociated Zicron", *Journal of American Ceramic Society* 65,1982, which proceeds by a martensitic phase transformation. Frequently associated with these transformations are strain effects due to the large volume changes incurred. These strain effects were not evident in the transformed silicon particles and there appeared to be little or no distortion of the particles after transformation.

The twinned regions appear to be randomly oriented with respect to neighboring particles, as would be expected for particles that underwent independent processing in the aerosol phase. The average crystallite size determined from x-ray peak broadening was fifty nanometers, in close agreement with that estimated from dark field transmission electron microscopy measurements. Based on these measurements the silicon particles produced by thermal decomposition of silane were three to four times as large as the crystallites. This is consistent with measurements made by Cannon et al. in the article cited above on silicon powders produced by laser induced pyrolysis of silane. The factor controlling the size of these crystallites produced during the amorphous/crystalline transformation is not certain even though there is some evidence that it is similar to a martensitic phase transformation. The particle size to crystallite size ratio appears to be independent of history. A very small fraction of powders are featureless, having no fine structure. An electron diffraction pattern of these particles, shown in FIG. 5, indicates that they are truly amorphous. The amorphous particles could also be distinguished from the crystalline powders by the absence of twins and stacking faults in their microstructures. These essentially featureless powders were uneffected by tilting, whereas contrast changes were observed in the twinned regions upon tilting. Chain agglomerates of microcrystalline particles accounted for less than one percent of the spherules. Some neck formation was observed in these few agglomerates of spherules.

Infrared absorption spectroscopy was used to explore the possible contamination of the surface with silicon oxides or silicon nitride. No detectable absorption by these species was found. The detection limits for these measurements were estimated to correspond to a layer an average of seven Angstroms thick on the surface of the particle.

Generation of new particles in carrying out the foregoing process is highly detrimental but does happen. To avoid it, the reaction rate is accelerated slowly forming a relatively small number of seed particles and the reaction is carried out at a rate such that vapor deposition on the seed particles dominates generation of new seed particles. Although five zones have been shown in the reactor FIG. 1, a minimum of three or absolute minimum of two may be employed. Conduction along the tube 10 gives a continuous variation in temperature.

In a second example of the method of the invention, silane and ammonia are employed using a temperature range of 750°–1800° K.

Although particular examples of the method of the invention have been described and illustrated herein, it is recognized that the general principles of the method of the subject invention is applicable to other systems. Consequently, it is intended that the claims be interpreted to cover such equivalent systems.

What is claimed is:

1. A method of producing submicron nonagglomerated particles of material in a single-stage flow reactor from a reactant or mixture of reactants containing a material out of which said particles are to be produced, said single-stage flow reactor defining a flow path, comprising the steps of:
   introducing a reactant or mixture of reactants at one end of said single-stage flow reactor;
   increasing the temperature along an initial section of said flow path of said single-stage flow reactor to initiate reaction at a rate to homogeneously generate seed particles in an initial section of said single-stage flow reactor;
   accelerating the reaction by increasing the temperature along said flow path of said single-stage flow reactor without mixing additional reactants with said seed particles in said flow path, thereby promoting growth of particles by chemical vapor deposition while minimizing agglomerate formation; and
   maintaining a concentration of particles in said single-stage flow reactor such that coagulation is inhibited within the residence time of said particles in said single-stage flow reactor, wherein the maximum temperature along the flow path of said single-stage flow reactor and a flow rate through said single-stage flow reactor along said flow path are controlled to bring the reaction to completion in the residence time of said submicron nonagglomerated particles.

2. The method of claim 1 in which the step of accelerating the reaction by increasing temperature along said flow path is carried out in a single zone of said single-stage flow reactor following said initial section.

3. The method of claim 1 in which the step of accelerating the reaction by increasing temperature along said flow path is carried out over a plurality of zones of said single-stage flow reactor following said initial section.

4. The method of claim 1 in which the concentration of seed particles generated in said initial section of said single-stage flow reactor is controlled to inhibit agglomeration in order to minimize variation in ultimate particle size.

5. The method of claim 1 in which the temperature and flow rate are controlled to generate end particles in the range of 0.05 to 0.5 microns.

6. The method of claim 5 in which the reactant is silane and a diluent is nitrogen.

7. The method of claim 6 in which the variation of the temperature along said flow path of said single-stage flow reactor ranges from approximately 770° K. to 1550° K.

8. The method of claim 5 in which the reactants are silane and ammonia.

9. The method of claim 1 in which the reactant is a halogenated metal and a reducing agent from Group I of the Periodic Table is employed.

10. The method of claim 1 in which the reactants are a halogenated metal and ammonia and a reducing agent from Group I of the Periodic Table.

11. The method of claim 1 in which the reactants are a halogenated metal and a hydrocarbon and a reducing agent from Group I of the Periodic Table.

* * * * *